United States Patent [19]
Goforth

[11] 3,858,343
[45] Jan. 7, 1975

[54] FISHING APPARATUS
[76] Inventor: David L. Goforth, 613 Kemp Rd. West, Greensboro, N.C.
[22] Filed: Mar. 8, 1973
[21] Appl. No.: 339,424

[52] U.S. Cl............. 43/42.17, 43/42.19, 43/42.28, 43/42.39, 43/43.4
[51] Int. Cl............................................ A01k 85/00
[58] Field of Search............ 43/42.17, 42.19, 42.39, 43/43.15, 43.2, 43.4, 42.2, 42.28

[56] References Cited
UNITED STATES PATENTS

| | | | |
|---|---|---|---|
| 1,457,373 | 6/1923 | Kessel | 43/43.2 |
| 1,566,812 | 12/1925 | Bayer | 43/42.4 |
| 2,086,008 | 7/1937 | Turner | 43/42.39 X |
| 2,323,096 | 6/1943 | McDowell | 43/42.17 |
| 2,814,151 | 11/1957 | Knapton | 43/43.15 |
| 2,851,815 | 9/1958 | Warner | 43/42.28 |
| 3,341,966 | 9/1967 | Pippen | 43/43.15 |
| 3,670,446 | 6/1972 | Wheeler | 43/42.19 |

Primary Examiner—Louis G. Mancene
Assistant Examiner—Daniel J. Leach

[57] ABSTRACT

A fishing apparatus including a lure having at least partial floatation is attached to a shaft having a rotatable spinner thereon. A weight is supported forwardly of and below the spinner for maintaining the lure and spinner adjacent a lake bottom without interfering with the spinner rotation.

8 Claims, 2 Drawing Figures

Patented Jan. 7, 1975

3,858,343

FISHING APPARATUS

BRIEF SUMMARY AND OBJECTS OF THE INVENTION

This application relates generally to fishing apparatus adapted to be cast and retrieved by a fisherman, and more particularly to fishing apparatus of the "sinker" or "bottom" type embodying a spinner or other rotatable element and a lure.

Attaching a weight or sinker to a line or shaft forwardly or rearwardly of a spinner in a conventional manner would result in the weight dragging the bottom and preventing rotation of the spinner.

Briefly, the present invention includes a lure and spinner adapted to be drawn through the water close to but spaced above a lake or stream bottom. The lure has at least partial floatation which would result in the lure and spinner moving away from the bottom. The spinner is positioned forwardly of the lure for rotation as the apparatus is drawn through the water. A weight is attached forwardly of the spinner for engagement with the bottom but depends sufficiently below the fishing line and spinner to permit free rotation of the spinner.

One of the primary objects of the invention is the provision of a new and improved fishing apparatus.

Another object of the invention is the provision of a fishing apparatus wherein a spinner and lure are maintained adjacent a lake or river bottom by a weight without interfering with the rotation of the spinner as the apparatus is drawn through the water.

A further object of the invention is the provision of a fishing apparatus which is of simple and practical construction, which is efficient and reliable in operation and which is inexpensive to manufacture.

Other objects and advantages of the invention will become apparent when considered in view of the following detailed description.

DETAILED DESCRIPTION OF THE INVENTION

Figure 1:
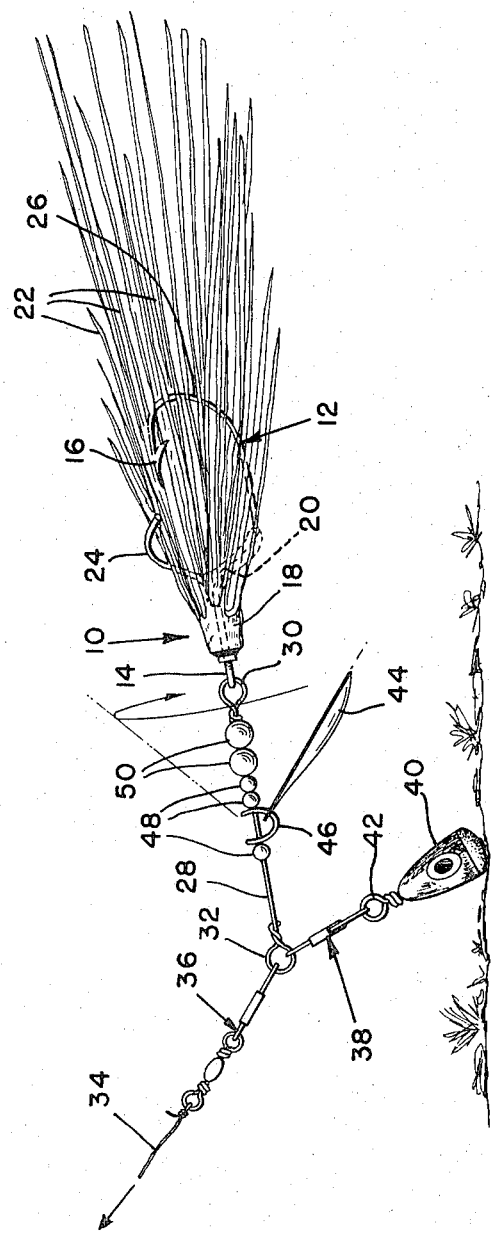
FIG. 1 is a side elevational view of one embodiment of the fishing apparatus of the present invention including a lure having at least partial floatation, a spinner, and a weight positioned forwardly of and below the spinner and in engagement with the bottom of a lake or river.

Referring to the drawing, and particularly to FIG. 1, there is illustrated a fishing lure 10, which may be of a conventional type, and which includes a hook 12 having an eyelet 14 at one end and a barb 16 at the opposite end. A body portion 18 is attached to the hook shank 20 and has a plurality of plastic strands 22 or the like which project rearwardly to partially conceal the rear or barb portion 16 of the hook. The plastic strands tend to float the lure towards the top of the water. It is to be understood that other materials such as feathers, hair, etc. having at least partial floatation may be provided upon the hook 12. The lure also may be provided with a weed deflecting finger 24 such as disclosed in U.S. patent application Ser. No. 269,486, filed July 6, 1972. The shank 20 is bent to include an offset portion such that the hookbill 26 is substantially centrally located with respect to the hook eyelet 14. The lure normally runs upside down, as shown by FIG. 1, such that the barb 16 extends upwardly.

Extending forwardly of and secured to the hook eyelet 14 is an elongated wire or shaft member 28 having eyelets 30 and 32 at opposite ends. The eyelet 30 interconnects with the hook eyelet 14, while the fishing line 34 is attached to the eyelet 32. The line 34 may be attached directly to the eyelet 32 or by means of a safety pin type connector 36, as shown by FIG. 1.

Also attached to the eyelet 32 of wire member 28 is a connector assembly 38, which may be of the safety pin type, having a weight 40 attached thereto. The weight 40, which may be of lead or other suitable materials, is provided with an attaching eye 42 for releasable connection to the safety pin type connector assembly 38. The weight 40, due to the connection with eyelet 32, hangs downwardly from the wire member 28.

A spinner blade 44 is rotatably mounted upon the elongated wire member 28 forwardly of the lure 10. In the preferred embodiment, the spinner 44 is provided adjacent one end with an opening through which extends a generally U-shaped member 46. The legs of the member 46 are provided with aligned openings through which the straight portion of the wire member 28 extends. Spacer beads 48, 50 are mounted upon the wire member 28 at opposite sides of the spinner supporting U-shaped member 46.

In operation, the lure 10, spinner 44, and weight 40 are pulled through the water substantially as shown by FIG. 1. The lure 10, due to the floatation of the strands 22, tends to move upwardly. The weight 40, however, is sufficient to overcome this floatation and pulls the lure 10 downwardly until the weight 40 engages the lake or river bottom, as shown by FIG. 1. Attaching the weight in this manner permits the lure and hook to travel close to but spaced from the bottom and also avoids interference of the rotating spinner blade 44 with the bottom. Mounting the weight 40 in a conventional manner directly upon the wire member 28 or lure 10 would result in the lure being pulled downwardly into engagement with the bottom. The spinner 44 also would strike the bottom thereby preventing rotation. Note that the bottom of the weight 40 is located a considerable distance below the lowermost portion of the spinner 44 such that the spinner is located well above the lake bottom as the apparatus is drawn through the water.

Figure 2:
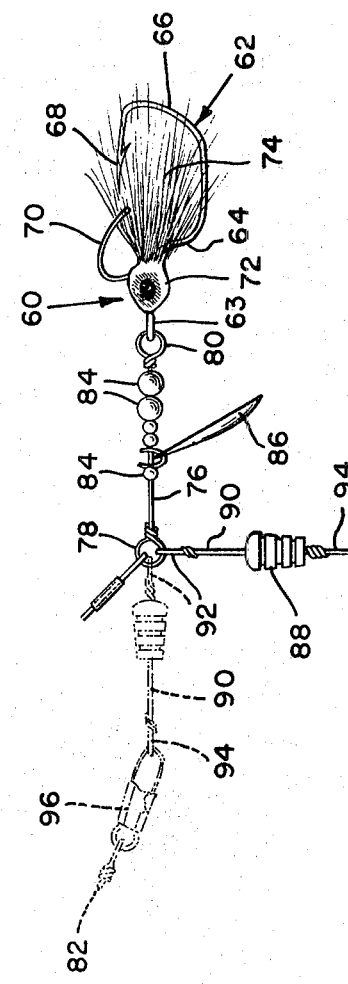
FIG. 2 is a side elevational view of another embodiment of the invention with the line attached at one side of the weight, as shown in full lines, and attached at the opposite side of the weight, as shown in broken lines, such that the weight depends downwardly below the spinner and lure.

The embodiment of FIG. 2 includes a lure 60 consisting of a fishhook 62 having an eyelet 63, a bent shank 64, a twisted, offset hookbill 66, and a barb 68. A projecting weed deflector finger 70, which may be of thermoplastic material, is secured to the shank 64 of the fishhook in spaced relation to the barb 68 to permit the fish to take the hook unimpaired while still protecting the hook from weeds and other underwater objects as the lure is drawn through the water. A suitable covering 72 of plastic or other waterproof material is secured to the shank 64 for retaining the finger 70 in position. Feathers or bristles 74 are secured by the covering 72, which is adjacent to the hook eye 63, and extends rearwardly for camouflaging the hook bill and barb. The covering or coating 72 may be of various shades and colors and is formed to resemble an insect.

A wire member 76 having loops 78, 80 at each end, as described above in the FIG. 1 embodiment, has one loop 78 attached to the line 82 and the other loop 80 attached to the lure 60. Spacers 84 and the spinner 86 are positioned upon the wire members 76 as described in the FIG. 1 embodiment.

A weight or sinker 88 is slidably mounted upon a wire member 90 which has loops or eyelets 92, 94 at opposite ends, the eyelet 92 being secured to the eyelet 78 of the wire member. During normal operation of the apparatus the weight 88 is positioned at the lowermost end of member 90 and urges eyelet 94 into engagement with the lake bottom. The floatation effect of the lure 60 moves the lure and spinner 86 upwardly, such that as the apparatus is pulled through the water the various components assume positions substantially as shown by FIG. 1. This action permits the lure to run extremely close to the lake bottom without interfering with the spinner rotation.

The eyelet 94 may be attached to the line 82 by means of a safety pin type fastener 96, as shown by divided lines, FIG. 2, when fishing for pickerel or other fish which tend to cut the line 82. This provides an added length of wire between the hook 62 and the line 82.

The lures may be provided with different colored body portions, strands, or bristles, and the weights may be of different sizes, types, colors, etc. However, the distance the weight is spaced below the wire member 28 or 76 should be sufficient to permit the spinner to rotate freely without striking the bottom when being drawn through the water.

I claim:

1. Fishing apparatus adapted for casting and trolling comprising an elongated shaft means, spinner means rotatably carried by said shaft means, said shaft means being provided with a first line attaching means ahead of said spinner means and a second fishhook attaching means rearwardly of said spinner means, fishhook means, having sufficient floatation to urge the fishhook means and spinner means upwardly, attached to said second attaching means of said shaft means, said fishhook means including a shank with an eyelet at one end and a hook bill and barb at the other end, a resilient deflector finger secured to said shank adjacent said eyelet and extending outwardly and rearwardly toward said barb, and weight means supported by said shaft means forwardly of and in spaced relation to said spinner means, said weight means including a weight suspended below said shaft means for swinging movement relative to said shaft means and for maintaining the fishhook means adjacent the bottom of a body of water as the apparatus is drawn through the water, said weight being positioned below said spinner a distance sufficient to avoid interference of the spinner rotations with the weight and the bottom.

2. Fishing apparatus as recited in claim 1, wherein said weight means is attached to said first line attaching means.

3. Fishing apparatus as recited in claim 1, wherein said hook bill and barb are twisted and offset with respect to said shank.

4. Fishing apparatus as recited in claim 1, and further including camouflaging means supported by said shank and extending rearwardly for at least partially concealing said hook bill and barb.

5. Fishing apparatus as recited in claim 1, and further including spacer means upon said shaft means forwardly and rearwardly of said spinner means.

6. Fishing apparatus as recited in claim 1, wherein said weight means is suspended below said first line attaching means by an elongated, releasable connector.

7. Fishing apparatus as recited in claim 1 wherein said weight means includes an elongated shaft depending from said first line attaching means, said weight being slidably displaceable upon said shaft.

8. Fishing apparatus as recited in claim 7, wherein said shaft has an eyelet provided at the end portion thereof remote to said first line attaching means.

* * * * *